United States Patent
Lee

(10) Patent No.: US 10,003,519 B2
(45) Date of Patent: Jun. 19, 2018

(54) DATA DELIVERY METHOD BASED ON SOFTWARE DEFINED NETWORKING AND SOFTWARE DEFINED NETWORKING CONTROLLER USING THE METHOD

(71) Applicant: NANNING FUGUI PRECISION INDUSTRIAL CO., LTD., Nanning (CN)

(72) Inventor: Chi-Feng Lee, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 257 days.

(21) Appl. No.: 14/940,411

(22) Filed: Nov. 13, 2015

(65) Prior Publication Data
US 2017/0141995 A1     May 18, 2017

(51) Int. Cl.
| | |
|---|---|
| *H04L 12/751* | (2013.01) |
| *H04L 12/715* | (2013.01) |
| *H04L 12/761* | (2013.01) |
| *H04L 12/707* | (2013.01) |
| *H04L 12/729* | (2013.01) |

(52) U.S. Cl.
CPC .......... *H04L 45/02* (2013.01); *H04L 45/125* (2013.01); *H04L 45/16* (2013.01); *H04L 45/22* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 2013/0322443 A1* | 12/2013 | Dunbar | H04L 12/185 370/390 |
| 2013/0329734 A1* | 12/2013 | Chesla | H04L 45/74 370/392 |
| 2014/0192645 A1 | 7/2014 | Zhang et al. | |
| 2014/0269415 A1* | 9/2014 | Banavalikar | H04L 12/185 370/254 |
| 2015/0062285 A1* | 3/2015 | Xu | H04L 12/1822 348/14.08 |
| 2015/0074276 A1 | 3/2015 | DeCusatis et al. | |
| 2015/0146575 A1* | 5/2015 | Singh | H04L 45/16 370/256 |
| 2015/0188808 A1* | 7/2015 | Ghanwani | H04L 41/12 709/244 |
| 2015/0200803 A1* | 7/2015 | Kashyap | H04L 41/12 370/217 |
| 2015/0222445 A1* | 8/2015 | Iyer | H04L 12/185 370/390 |

(Continued)

FOREIGN PATENT DOCUMENTS

| | | | | |
|---|---|---|---|---|
| EP | 3082307 A4 * | 12/2016 | ........ | H04L 12/6418 |
| TW | 201524162 | 6/2015 | | |
| WO | WO 2015149676 A1 * | 10/2015 | ........ | H04L 12/6418 |

*Primary Examiner* — Ayaz Sheikh
*Assistant Examiner* — Faiyazkhan Ghafoerkhan
(74) *Attorney, Agent, or Firm* — ScienBiziP, P.C.

(57) ABSTRACT

A data delivery method in a software defined network provides an optimized network delivery service. The method calculates an optimized tree transmission path from among several possible paths between a source client and a destination client. In addition, a unicast transmission is used to optimize a multicast transmission service.

17 Claims, 25 Drawing Sheets

(56) References Cited

U.S. PATENT DOCUMENTS

| | | | |
|---|---|---|---|
| 2015/0271268 A1* | 9/2015 | Finkelstein | H04L 67/12 370/400 |
| 2015/0326476 A1* | 11/2015 | Ye | H04L 47/12 370/235 |
| 2015/0350102 A1* | 12/2015 | Leon-Garcia | H04L 41/12 709/226 |
| 2016/0112728 A1* | 4/2016 | Kaushik | H04N 21/2385 725/116 |
| 2016/0191391 A1* | 6/2016 | Wood | H04L 47/125 370/235 |
| 2016/0218917 A1* | 7/2016 | Zhang | H04L 49/35 |
| 2016/0248690 A1* | 8/2016 | Banavalikar | H04L 47/39 |
| 2016/0294732 A1* | 10/2016 | Chou | H04L 49/25 |
| 2016/0315847 A1* | 10/2016 | Zhang | H04L 12/6418 |
| 2016/0352536 A1* | 12/2016 | Kim | H04L 12/4633 |
| 2017/0118041 A1* | 4/2017 | Bhattacharya | H04L 12/462 |

* cited by examiner

| | Path | Vertex | DIST[1] | DIST[2] | DIST[3] | DIST[4] | DIST[5] | DIST[6] | DIST[7] | DIST[8] |
|---|---|---|---|---|---|---|---|---|---|---|
| Start | -- | 5 | -- | -- | -- | 1500 | 0 | 250 | -- | -- |
| 1 | 5, | 6 | -- | -- | -- | 1250 | -- | 250 | 1150 | 1650 |
| 2 | 5,6 | 7 | -- | -- | -- | -- | -- | -- | 1150 | 1650 (2150) |
| 3 | 5,6,7 | 4 | -- | -- | 2450 | 1250 | -- | -- | -- | -- |
| 4 | 5,6,7,4 | 8 | <u>3850</u> | -- | -- | -- | -- | -- | -- | 1650 |
| 5 | 5,6,7,4,8 | 3 | 3450 | 3250 | 2450 | -- | -- | -- | -- | -- |
| 6 | 5,6,7,4,8,3 | 2 | 3450 (3550) | 3250 | -- | -- | -- | -- | -- | -- |
| 7 | 5,6,7,4,8,3,2 | 1 | 3450 | -- | -- | -- | -- | -- | -- | -- |

FIG. 5

| | Path | Vertex | PAC[1] | PAC[2] | PAC[3] | PAC[4] | PAC[5] | PAC[6] | PAC[7] | PAC[8] |
|---|---|---|---|---|---|---|---|---|---|---|
| Start | -- | 5 | -- | -- | -- | 1500 | 0 | 250 | -- | -- |
| 1 | 5, | 6 | -- | -- | -- | 1000 | -- | 250 | 900 | 1400 |
| 2 | 5,6 | 7 | -- | -- | -- | -- | -- | -- | 900 | 1000 |
| 3 | 5,6,7 | 4 | -- | -- | 1200 | 1000 | -- | -- | -- | -- |
| 4 | 5,6,7,4 | 8 | 1700 | -- | -- | -- | -- | -- | -- | 1000 |
| 5 | 5,6,7,4,8 | 3 | 1200 | 1200 | 1200 | -- | -- | -- | -- | -- |
| 6 | 5,6,7,4,8,3 | 2 | 1200 (1200) | 1200 | -- | -- | -- | -- | -- | -- |
| 7 | 5,6,7,4,8,3,2 | 1 | 1200 | -- | -- | -- | -- | -- | -- | -- |
| Speed | MaxSpeed(100G)/PAC; | | 83.3M | 83.3M | 83.3M | 100M | -- | 400M | 111.1M | 100M |

FIG. 6

| TPath111 TPath121 | TPath112 TPath122 | TPath211 TPath221 | TPath212 TPath222 | TPath311 TPath321 | TPath312 TPath322 |
|---|---|---|---|---|---|
| 5→6→4,7→3,8→1 | 5→6→4,8→3→1 | 5→6→4,7→3,8→2→1 | 5→6→4,8→3→2→1 | 5→6→7,4→8,1 | 5→6→7,4→8→1 and 5→4→8 |
| 1200 | 1400 | 1200 | 1400 | 1700 | 1700 |

DATA DELIVERY METHOD BASED ON SOFTWARE DEFINED NETWORKING AND SOFTWARE DEFINED NETWORKING CONTROLLER USING THE METHOD

FIELD

The subject matter herein generally relates to a data transmission delivery method and system based on software-defined networking (SDN).

BACKGROUND

As mobile networks are rapidly developed and smart phones are popular, network application services become more and more important for users. Multicasting (one-to-many) network services, such as instant message services, video conferences, file transmission, and firmware update, are frequently used by people. However, when the multicasting network services are implemented by unicasting (one-to-one), critical effects become apparent in network performance.

BRIEF DESCRIPTION OF THE DRAWINGS

Implementations of the present technology will now be described, by way of example only, with reference to the attached figures.

FIG. 5 is a diagrammatic view of an embodiment of a distance table generated using the OFP method, wherein the distance table records at least one optimized transmission path with the shortest distance, the minimum cost, and at least one backup transmission path between SDN forwarding devices;

FIG. 6 is a diagrammatic view of an embodiment of a path available cost (PAC) table generated using the OFP method, wherein the PAC table records at least one optimized transmission path with the maximum bandwidth and at least one backup transmission path between SDN forwarding devices;

FIG. 7 is a diagrammatic view of an embodiment of a tree transmission path set generated using the OFP method.

DETAILED DESCRIPTION

Figure 1:
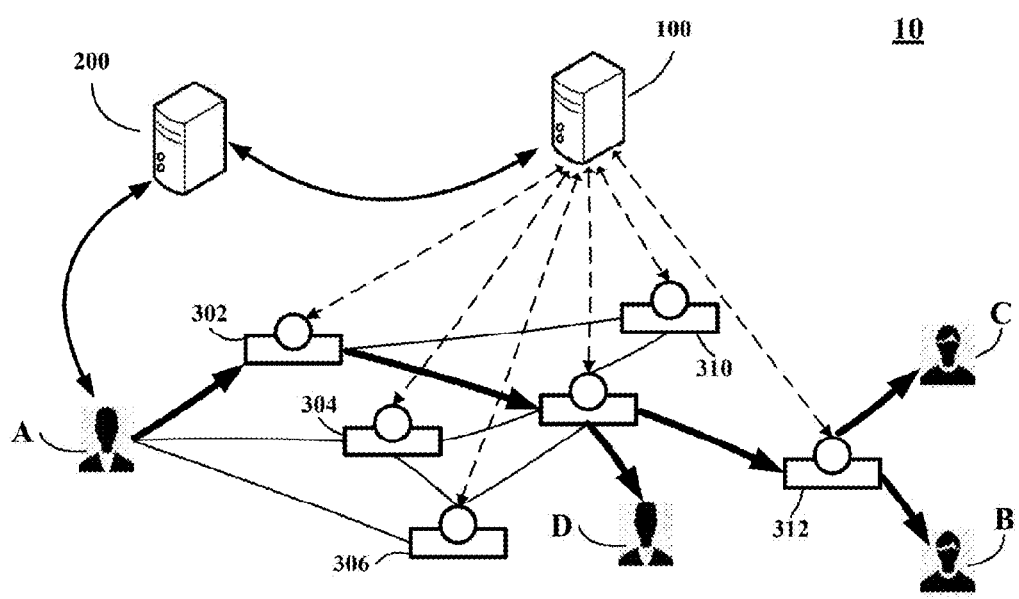
FIG. 1 is a diagrammatic view of an embodiment of a data delivery system based on software defined networking (SDN)

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

An embodiment of a data delivery method and system based on software-defined networking (SDN) makes a data stream for a multicasting service narrower, to be repeatedly transmitted by an optimized transmission path based on an optimized forwarding path (OFP) method. Additionally, a single data stream is delivered to a forwarding device by the optimized transmission path and can be forwarded or copied to another forwarding device or to a target client. Thus, the method and system provides advantages of bandwidth saving, performance enhancement, and easier maintenance.

FIG. 1 illustrates an embodiment of an SDN data delivery system.

An embodiment of a data delivery system 10 comprises an SDN controller 100, a central manager 200, SDN forwarding devices 302-312, and clients A, B, C, and D. The SDN controller 100 provides group forwarding services. The central manager 200 is in charge of communications and coordinates with the forwarding devices 302 . . . 312 and configures entry information for the clients A, B, C, and D.

The one or more function modules can include computerized code in the form of one or more programs that are stored in a storage unit (not shown), and executed by a processor (not shown) to provide functions of the SDN controller 100. The storage unit (not shown) can be a dedicated memory, such as an EPROM or a flash memory. Descriptions of the functions of the functional blocks are given with reference to FIG. 1.

Figure 2:
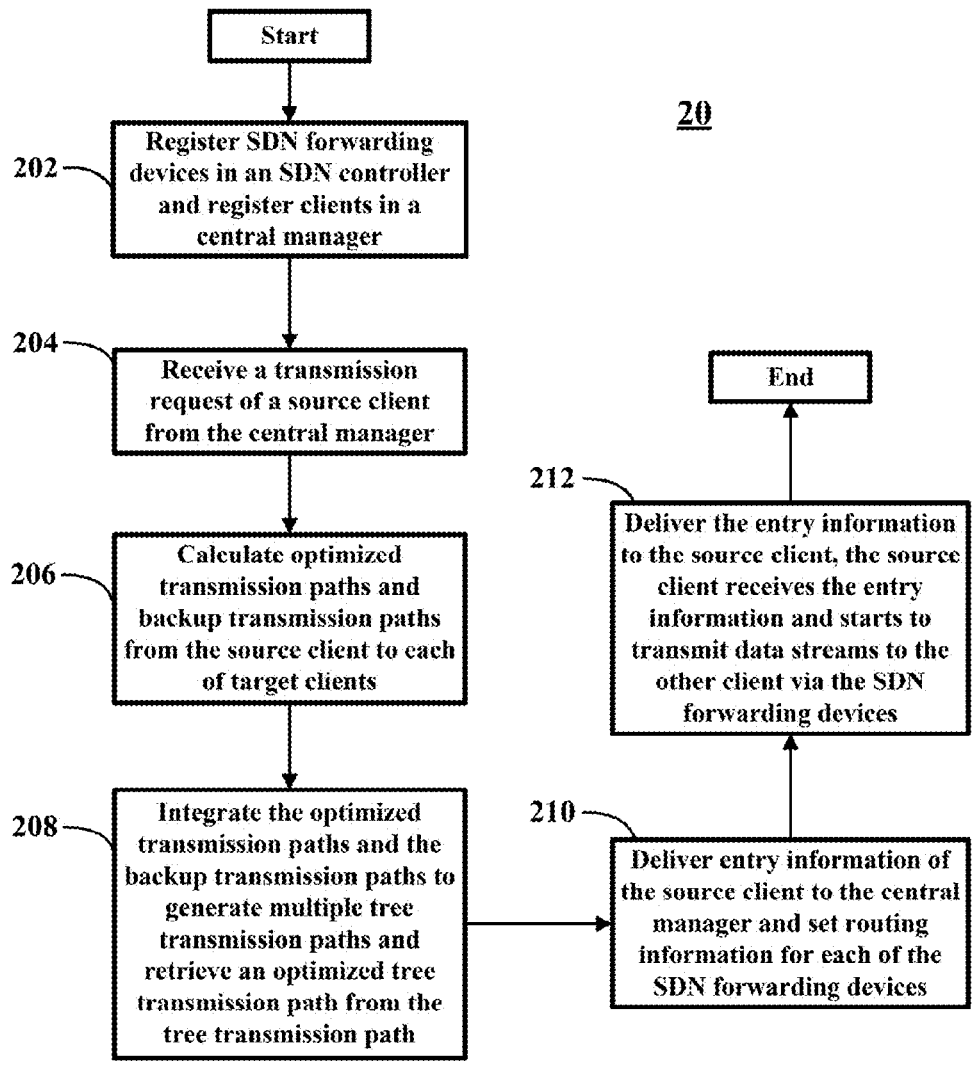
FIG. 2 is a flowchart of an embodiment of a data delivery method based on SDN.

FIG. 2 illustrates an embodiment of a flowchart of an SDN data delivery method 20.

Referring to FIG. 2, a flowchart is an example embodiment of a data delivery method 20. The data delivery method 20 is provided by way of example, as there are a variety of ways to carry out the method. The method 20 described below can be carried out using the configurations illustrated in FIG. 1, for example, and various elements of these figures are referenced in explaining the processing method 20. Each block shown in FIG. 2 represents one or more processes, methods, or subroutines, carried out in the exemplary method 20. Additionally, the illustrated order of blocks is by example only and the order of the blocks can change. The monitoring method 20 can begin at block 202.

At block 202, the SDN forwarding devices 302 . . . 312 are registered in the SDN controller 100, while the clients A, B, C, and D are registered in the central manager 200.

At block 204, a source client, for example client A, sends a transmission request for a group forwarding service to the central manager 200. The central manager 200 receives and forwards the transmission request to the SDN controller 100.

At block 206, when the transmission request is received, the SDN controller 100 calculates an optimized transmission path and backup transmission paths from the client A to the clients B, C, and D using an optimized path available bandwidth (OPAB) method.

At block 208, the SDN controller 100 integrates the optimized transmission path and the backup transmission paths to generate multiple tree transmission paths using the OFP method and then retrieves an optimized tree transmission path from all the tree transmission paths.

At block 210, the SDN controller 100 delivers entry information of the client A to the central manager 200 and sets routing information for each of the SDN forwarding devices 302-312 according to the optimized tree transmission path.

At block 212, the central manager 200 delivers the entry information to the client A, so that the client A transmits data streams to the clients B, C, and D via the SDN forwarding devices 302 . . . 312.

In an embodiment, the OPAB method further provides the following processing operations, comprising:

(a) calculating transmission paths with the maximum bandwidth from a single node, an SDN forwarding device, to the others in a network topology, or generating transmission paths having minimum latency;

(b) recording a non-optimized transmission path as a backup transmission path;

(c) transmitting data streams via multiple transmission paths under the SDN network topology to raise performance and network utility rate;

(d) removing duplicate transmission paths and transmission paths having duplicate nodes;

(e) generating a distance table, recording at least one optimized transmission path with the shortest distance, and therefore the minimum cost, and at least one backup transmission path between SDN forwarding devices, and a path available cost (PAC) table, recording at least one optimized transmission path with the maximum bandwidth and at least one backup transmission path between SDN forwarding devices;

(f) calculating and obtaining transmissions based on the PAC table; and (g) dividing the transmission paths into multiple groups when the network topology is large, to enhance operation speeds.

Figure 3:
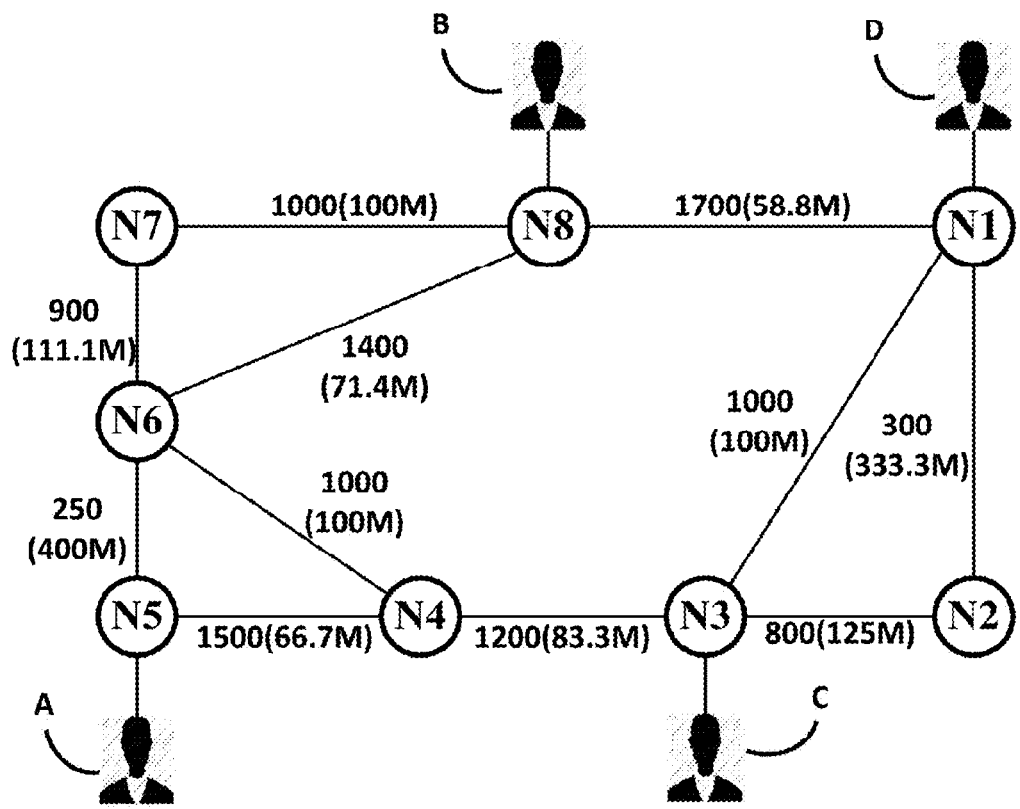
FIG. 3 is a diagrammatic view of an embodiment of an optimized forwarding path (OFP) method, showing calculation and generation of an optimized transmission path and backup transmission paths using an optimized path available bandwidth (OPAB) method.

FIG. 3 illustrates an embodiment of the OFP method, the calculating and generating of an optimized transmission path and backup transmission paths using the OPAB method.

Figure 4:
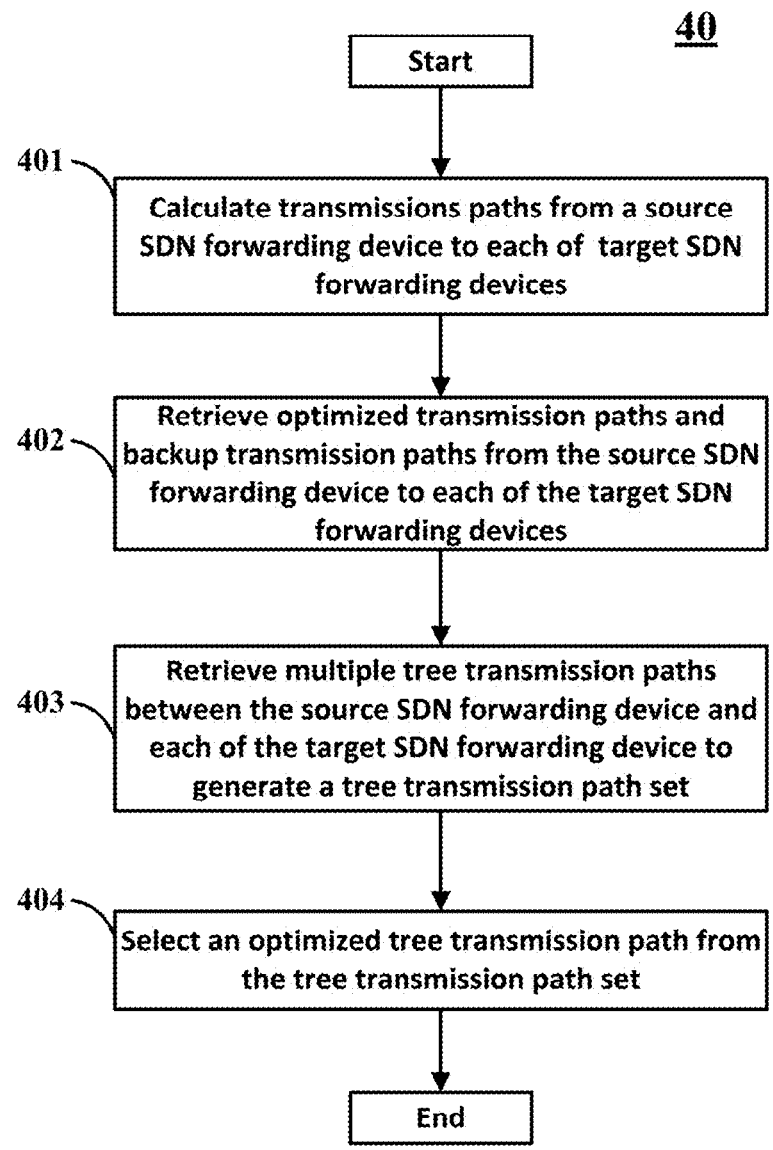
FIG. 4 shows a flowchart of an embodiment of the OFP method.

FIG. 4 illustrates an embodiment of the OFP method.

Referring to FIG. 4, a flowchart is presented as an example embodiment of an OFP method 40. The OFP method 40 is provided by way of example, as there are a variety of ways to carry out the method. The OFP method 40 described below can be carried out using the configurations illustrated in FIG. 1, for example, and various elements of these figures are referenced in explaining the method 40. Each block shown in FIG. 4 represents one or more processes, methods, or subroutines, carried out in the exemplary method 40. Additionally, the illustrated order of blocks is by example only and the order of the blocks can change. The OFP method 40 can begin at block 401.

In an embodiment, a network topology shown in FIG. 3 comprises the clients A, B, C, and D, and SDN forwarding devices N1 . . . N8. Distances, cost values, and corresponding bandwidths in bits per second (bps) between each of the SDN forwarding devices are shown by numbers beside the transmission paths. The bandwidths of the transmission paths are calculated according to, but are not limited to, a cost matrix shown as table 1.

TABLE 1

| Bandwidth in bps | Cost |
|---|---|
| 100G | 1 |
| 10G | 10 |
| 1G | 100 |
| 100M | 1000 |

At block 401, transmissions paths from each of the initial SDN forwarding devices, N1, N3, N5, and N8 for example, to the other SDN forwarding devices are calculated and generated using the OPAB method.

In an embodiment, the SDN forwarding device N5 connecting to the client A is set as an initial node, and the distance table shown in FIG. 5 and the PAC table shown in FIG. 6 are generated using the OPAB method.

At block 402, at least one optimized transmission path and multiple backup transmission paths (from the SDN forwarding device N5 to the SDN forwarding devices N1, N3, and N8) are retrieved based on the distance table shown in FIG. 5 and the PAC table shown in FIG. 6.

The transmission paths, which are obtained according to the distance table shown in FIG. 5 and the PAC table shown in FIG. 6, are explained as follows;

Transmission paths from the SDN forwarding device N5 to the SDN forwarding device N1 (Path$_1$) comprise:
Path$_{11}$: 1→3→4→6→5 (Cost: 1200, Speed: 83.3 M);
Path$_{12}$: 1→2→3→4→6→5 (Cost: 1200, Speed: 83.3 M);
Path$_{13}$: 1→8→7→6→5 (Cost: 1700, Speed: 58.8 M);
Path$_{14}$: 1→3→4→5 (Cost: 1500, Speed: 66.7 M);
Path$_{15}$: 1→2→3→4→5 (Cost: 1200, Speed: 66.7 M); and
Path$_{16}$: 1→2→3→4→6→5 (Cost: 1200, Speed: 58.8 M).

Transmission paths from the SDN forwarding device N5 to the SDN forwarding device N1 (Path$_3$) comprise:
Path$_{31}$: 3→4→6→5 (Cost: 1200); and
Path$_{32}$: 3→4→5 (Cost: 1500).

Transmission paths from the SDN forwarding device N5 to the SDN forwarding device N8 (Path$_8$) comprise:
Path$_{81}$: 8→7→6→5 (Cost: 1000); and
Path$_{82}$: 8→6→5 (Cost: 1400).

At block 403, multiple tree transmission paths between the SDN forwarding device N5 of the client A and the SDN forwarding device N1 of the client D, and between the SDN forwarding device N3 of the client C and the SDN forwarding device N8 of the client B are retrieved from the transmission paths, thus generating a tree transmission path set.

The transmission paths from Path$_1$, Path$_3$ and Path$_8$ are rearranged to obtain the tree transmission paths, TPath$_{ijk}$, as shown in FIG. 7, in which i indicates the i-th transmission path from Path$_1$, j indicates the j-th transmission path from Path$_3$, and k indicates the k-th transmission path from Path$_8$.

At block 404, an optimized tree transmission path is selected from the tree transmission path set according to the cost values of the tree transmission paths.

Figures 1A, 8:
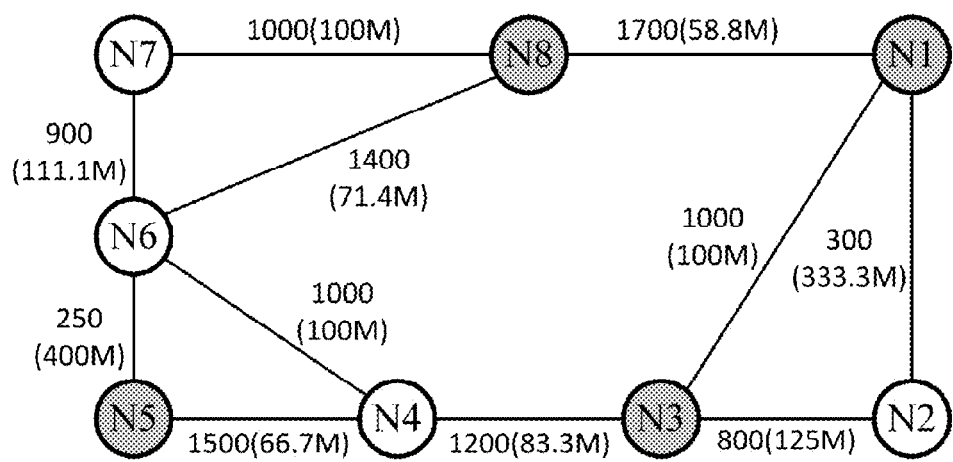
FIGS. 8-1A-8-1I and 8-2A-8-2I are diagrammatic view of an embodiment of a flow generating transmission paths using the OFP method.
Figures 2A, 8:
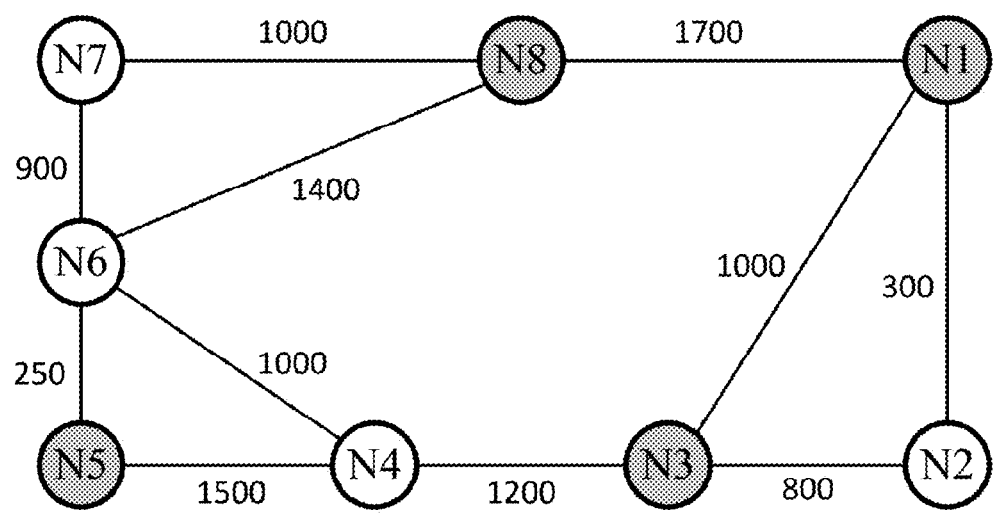

FIGS. 8-1A-8-1I and 8-2A-8-2I illustrate an embodiment for generating transmission paths from the SDN forwarding device N5 to the SDN forwarding device N1 using the OFP method. FIG. 8-1A shows the bandwidths between each of the SDN forwarding devices. FIG. 8-2A shows the cost values between each of the SDN forwarding devices.

Figures 1B, 8:
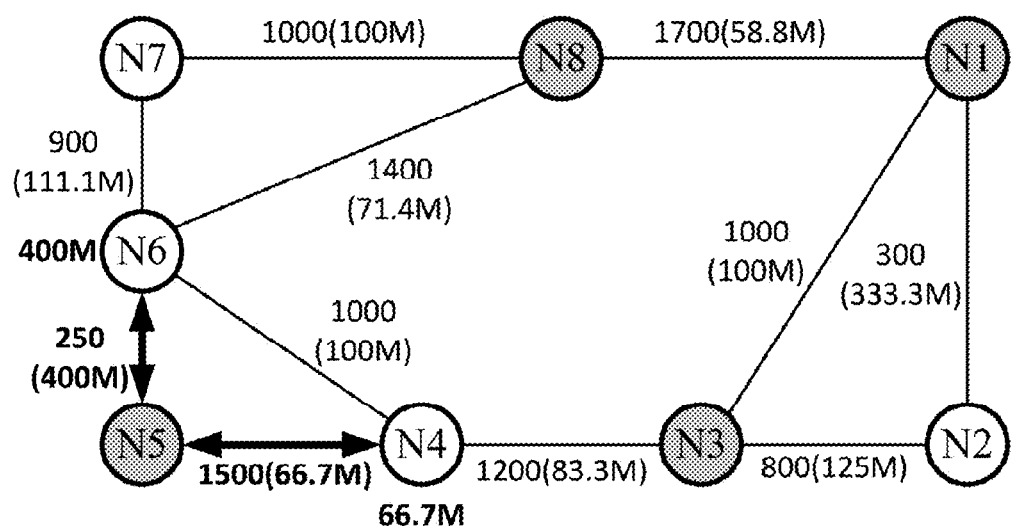
Figures 2B, 8:
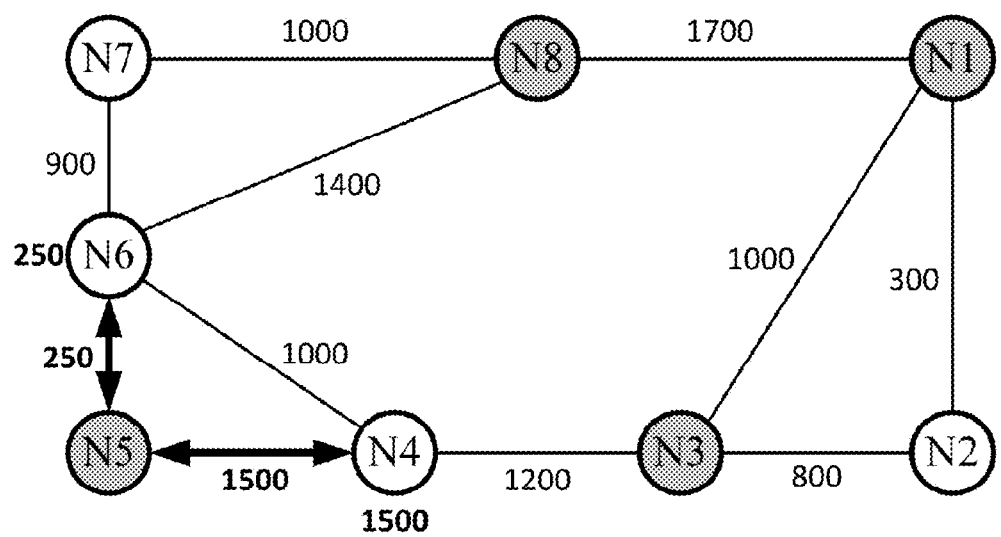

Referring to FIGS. 8-1B and 8-2B, the bandwidth and cost value of the transmission from the SDN forwarding device N5 to the SDN forwarding device N4 are configured as 66.4 M and 1500, and the bandwidth and cost value of the transmission from the SDN forwarding device N5 to the SDN forwarding device N6 are configured as 400 M and 250. Accordingly, the obtained transmission paths comprise:
N5→N4 (Bandwidth: 66.4 M, Cost: 1500); and
N5→N6 (Bandwidth: 400 M, Cost: 250).

Figures 1C, 8:
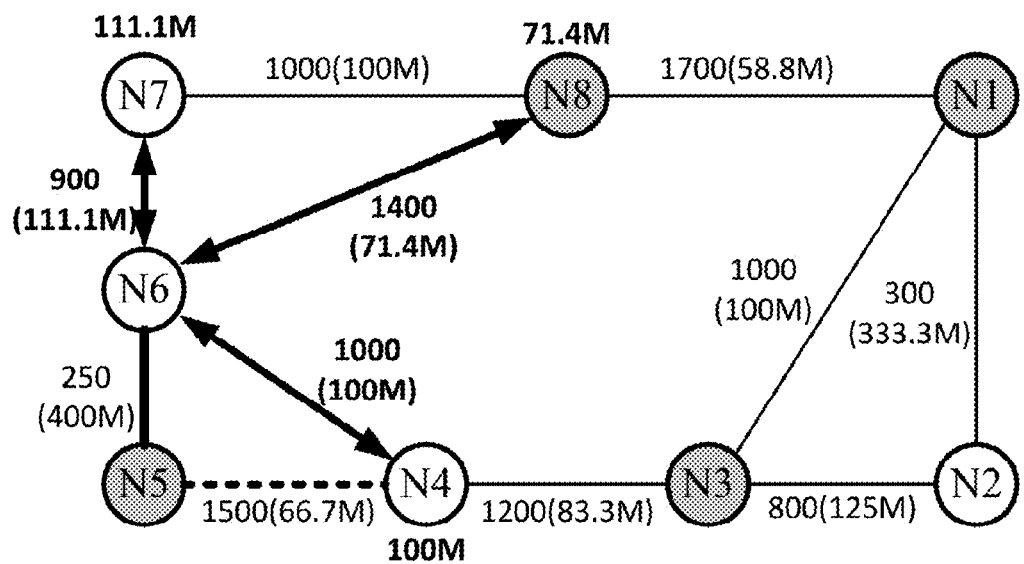
Figures 2C, 8:
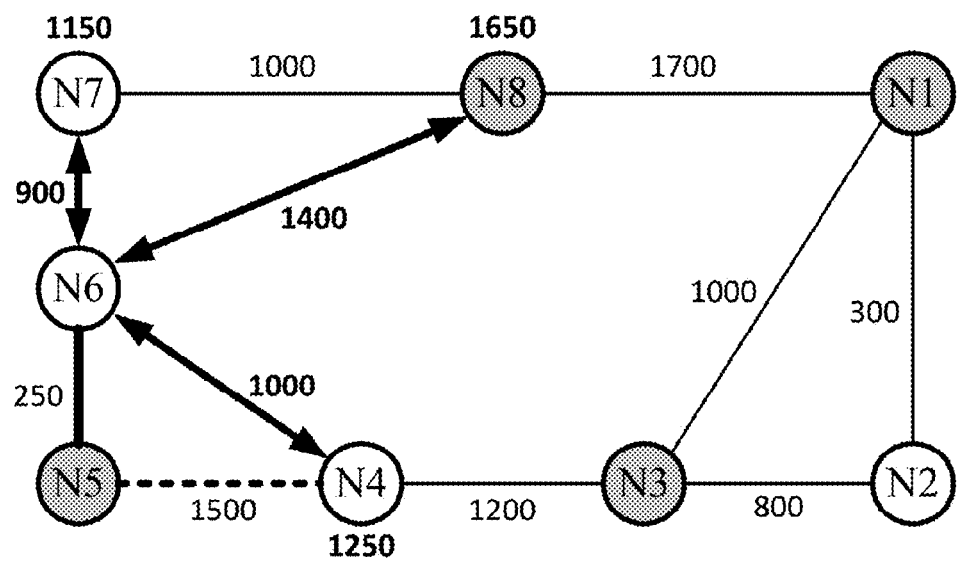

Referring to FIGS. 8-1C and 8-2C, the bandwidth and cost value of the transmission from the SDN forwarding device N5 to the SDN forwarding device N4 via the SDN forwarding device N6 are configured as 100 M and 1500. The bandwidth and cost value of the transmission from the SDN forwarding device N5 to the SDN forwarding device N7 via the SDN forwarding device N6 are configured as 111.1 M and 1150 (=250+900), and the bandwidth and cost value of the transmission from the SDN forwarding device N5 to the SDN forwarding device N8 via the SDN forwarding device N6 are configured as 71.4 M and 1650 (=250+1400). Accordingly, the obtained transmission paths comprise:

$\boxed{\text{N5→N4}}$ (Bandwidth: 66.4 M, Cost: 1500);
N5→N6 (Bandwidth: 400 M, Cost: 250);

$\boxed{\text{N5→N6→N4}}$ (Bandwidth: 100 M, Cost: 1250);
N5→N6→N7 (Bandwidth: 111.1 M, Cost: 1150); and
N5→N6→N8 (Bandwidth: 71.4 M, Cost: 1650).

Of all the above transmission paths, transmission paths having the same beginning and ending nodes comprise N5→N4 and N5→N6→N4. Comparing the bandwidths and cost values, the transmission path N5→N6→N4 is better and is selected.

Therefore, the remaining transmission paths comprise:
N5→N6 (Bandwidth: 400 M, Cost: 250);
N5→N6→N4 (Bandwidth: 100 M, Cost: 1250);
N5→N6→N7 (Bandwidth: 111.1 M, Cost: 1150); and
N5→N6→N8 (Bandwidth: 71.4 M, Cost: 1650).

Figures 1D, 8:
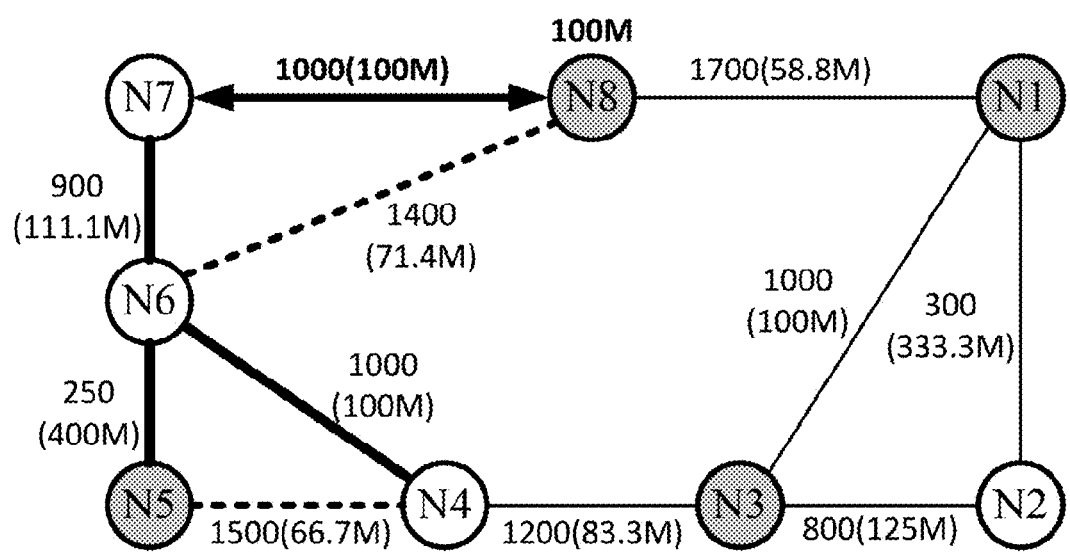
Figures 2D, 8:
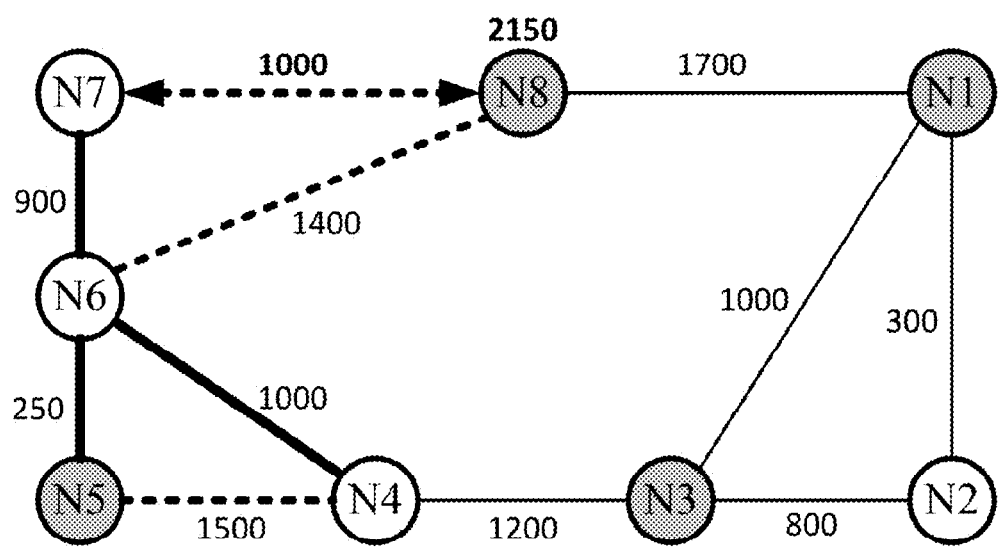

Referring to FIGS. 8-1D and 8-2D, the bandwidth and cost value of the transmission from the SDN forwarding device N5 to the SDN forwarding device N8 via the SDN forwarding device N6 and N7 are configured as 100 M and 2150 (=250+900+1000) Accordingly, the obtained transmission paths comprise:
N5→N6 (Bandwidth: 400 M, Cost: 250);
N5→N6→N4 (Bandwidth: 100 M, Cost: 1250);
N5→N6→N7 (Bandwidth: 111.1 M, Cost: 1150);

$\boxed{\text{N5→N6→N8}}$ (Bandwidth: 71.4 M, Cost: 1650); and $\boxed{\text{N5→N6→N7→N8}}$ (Bandwidth: 100 M, Cost: 2150).

Of all the above transmission paths, transmission paths having the same beginning and ending nodes comprise N5→N6→N8 and N5→N6→N7→N8. Comparing the bandwidths and cost values, even though the transmission path N5→N6→N8 has the lower cost value, the transmission path N5→N6→N7→N8 is selected due to the larger bandwidth. Therefore, the remaining transmission paths comprise:
N5→N6 (Bandwidth: 400 M, Cost: 250);
N5→N6→N4 (Bandwidth: 100 M, Cost: 1250);
N5→N6→N7 (Bandwidth: 111.1 M, Cost: 1150); and
N5→N6→N7→N8 (Bandwidth: 100 M, Cost: 2150).

Figures 1E, 8:
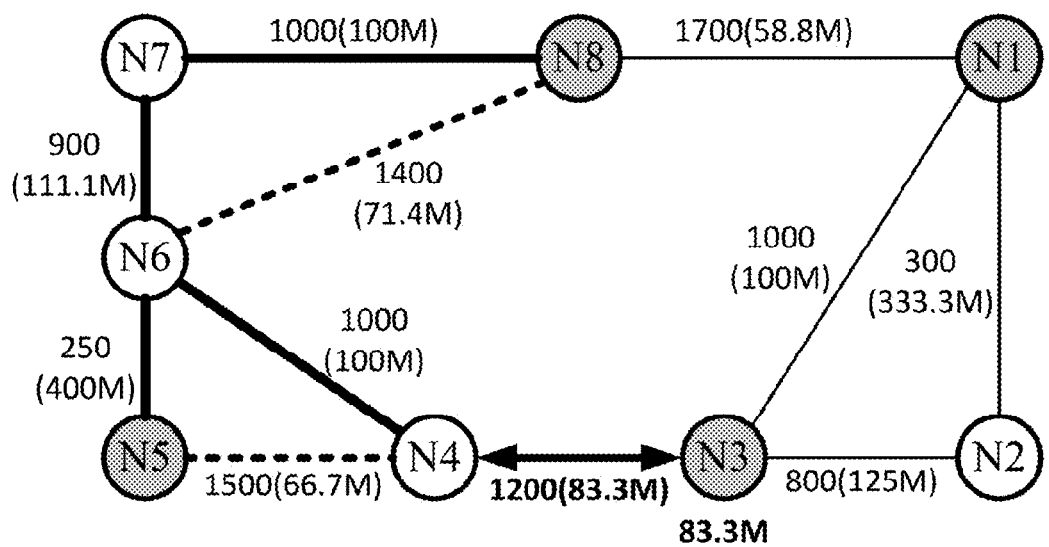
Figures 2E, 8:
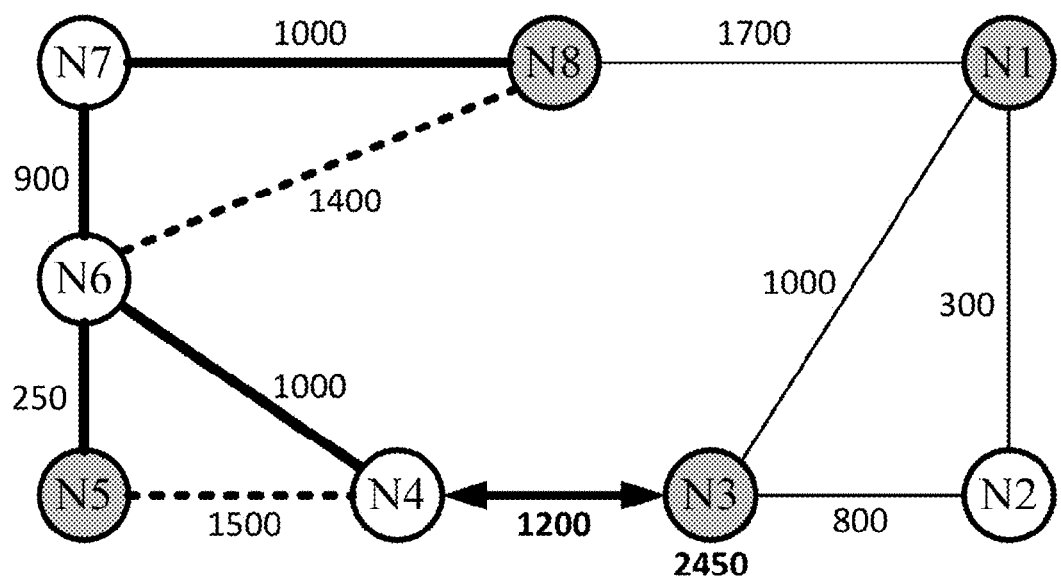

Referring to FIGS. 8-1E and 8-2E, the bandwidth and cost value of the transmission from the SDN forwarding device N5 to the SDN forwarding device N3 via the SDN forwarding device N6 and N4 are configured as 83.3 M and 2450 (=250+1000+1200) Accordingly, the obtained transmission paths comprise:
N5→N6 (Bandwidth: 400 M, Cost: 250);
N5→N6→N4 (Bandwidth: 100 M, Cost: 1250);
N5→N6→N7 (Bandwidth: 111.1 M, Cost: 1150);
N5→N6→N7→N8 (Bandwidth: 100 M, Cost: 2150); and
N5→N6→N4→N3 (Bandwidth: 83.3 M, Cost: 2450).

Figures 1F, 8:
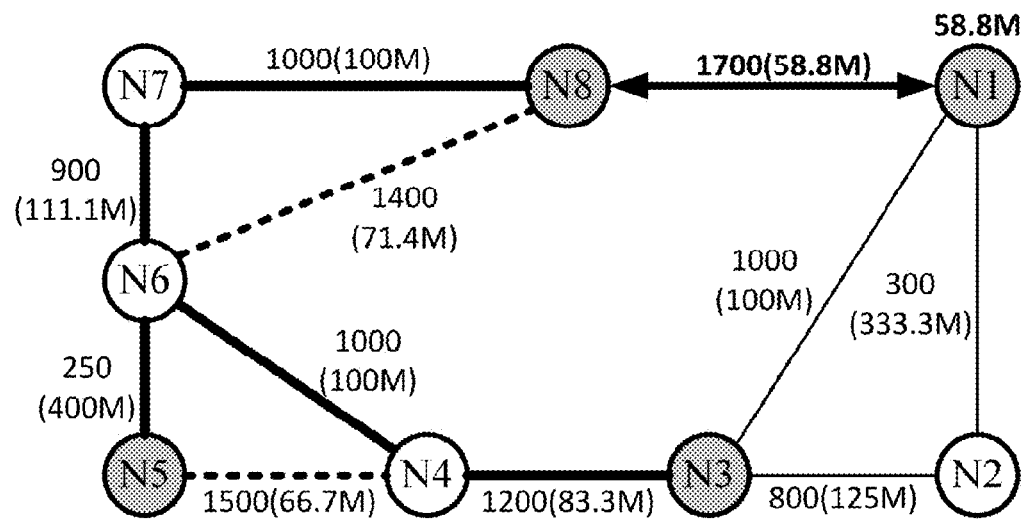
Figures 2F, 8:
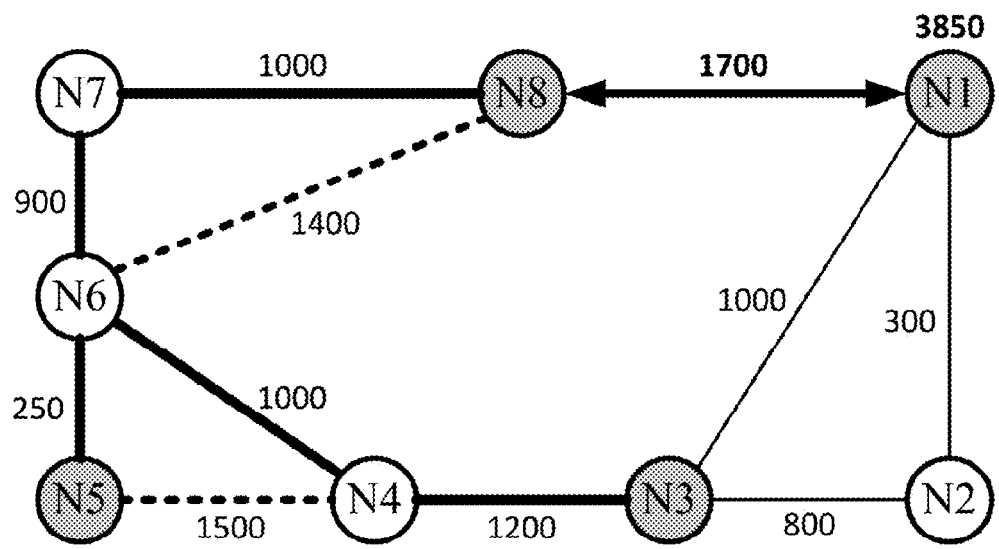

Referring to FIGS. 8-1F and 8-2F, the bandwidth and cost value of the transmission from the SDN forwarding device N5 to the SDN forwarding device N1 via the SDN forwarding device N6, N7, and N8 are configured as 58.8 M and 3850 (=250+900+1000+1700) Accordingly, the obtained transmission paths comprise:
N5→N6 (Bandwidth: 400 M, Cost: 250);
N5→N6→N4 (Bandwidth: 100 M, Cost: 1250);
N5→N6→N7 (Bandwidth: 111.1 M, Cost: 1150);
N5→N6→N7→N8 (Bandwidth: 100 M, Cost: 2150);
N5→N6→N4→N3 (Bandwidth: 83.3 M, Cost: 2450); and
N5→N6→N7→N8→N1 (Bandwidth: 58.8 M, Cost: 3850).

Figures 1G, 8:
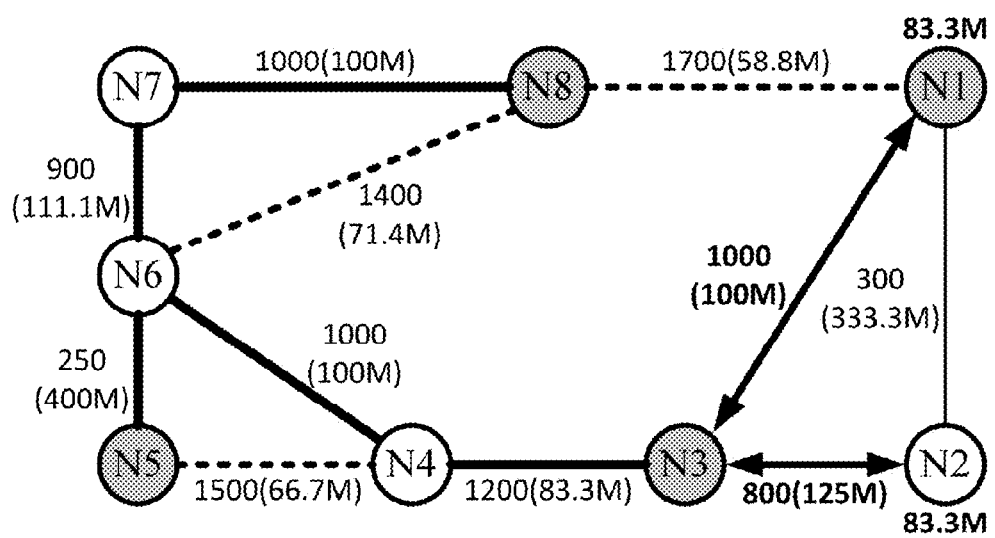
Figures 2G, 8:
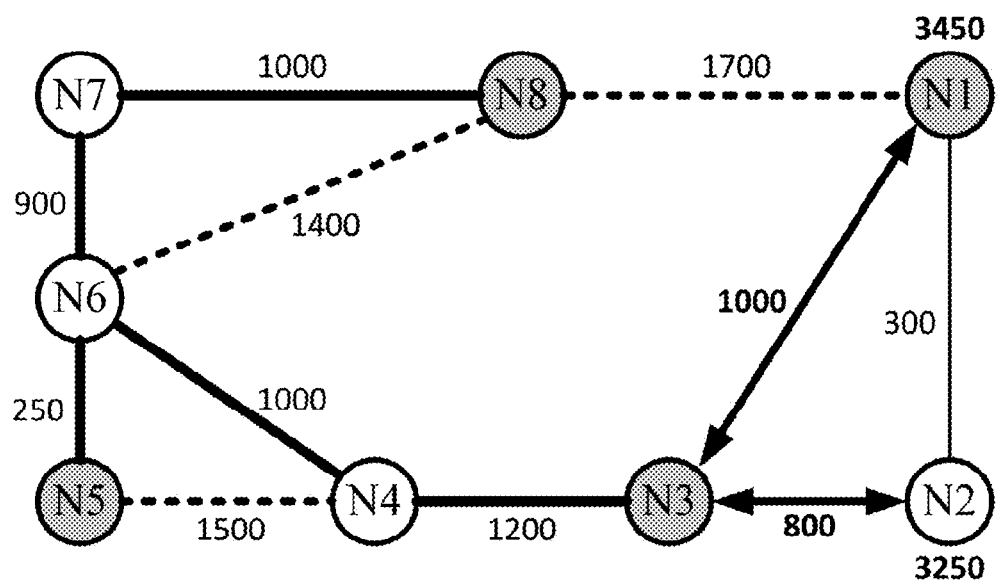

Referring to FIGS. 8-1G and 8-2G, the bandwidth and cost value of the transmission from the SDN forwarding device N5 to the SDN forwarding device N1 via the SDN forwarding device N4 and N3 are configured as 83.3 M and 3450 (=250+1000+1200+1000), and the bandwidth and cost value of the transmission from the SDN forwarding device N5 to the SDN forwarding device N2 via the SDN forwarding device N4 and N3 are configured as 83.3 M and 3250 (=250+1000+1200+800). Accordingly, the obtained transmission paths comprise:
N5→N6 (Bandwidth: 400 M, Cost: 250);
N5→N6→N4 (Bandwidth: 100 M, Cost: 1250);
N5→N6→N7 (Bandwidth: 111.1 M, Cost: 1150);
N5→N6→N7→N8 (Bandwidth: 100 M, Cost: 2150);
N5→N6→N4→N3 (Bandwidth: 83.3 M, Cost: 2450);

$\boxed{\text{N5→N6→N7→N8→N1}}$ (Bandwidth: 58.8 M, Cost: 3850);

$\boxed{\text{N5→N6→N4→N3→N1}}$ (Bandwidth: 83.3 M, Cost: 3450); and
N5→N6→N4→N3→N2 (Bandwidth: 83.3 M, Cost: 3250).

Of all the above transmission paths, transmission paths having the same beginning and ending nodes comprise N5→N6→N7→N8→N1 and N5→N6→N4→N3→N1. Comparing the bandwidths and cost values, the transmission path N5→N6→N4→N3→N1 is better and is selected. Therefore, the remaining transmission paths comprise:
N5→N6 (Bandwidth: 400 M, Cost: 250);
N5→N6→N4 (Bandwidth: 100 M, Cost: 1250);
N5→N6→N7 (Bandwidth: 111.1 M, Cost: 1150);
N5→N6→N7→N8 (Bandwidth: 100 M, Cost: 2150);
N5→N6→N4→N3 (Bandwidth: 83.3 M, Cost: 2450);
N5→N6→N4→N3→N1 (Bandwidth: 83.3 M, Cost: 3450); and
N5→N6→N4→N3→N2 (Bandwidth: 83.3 M, Cost: 3250).

Figures 1H, 8:
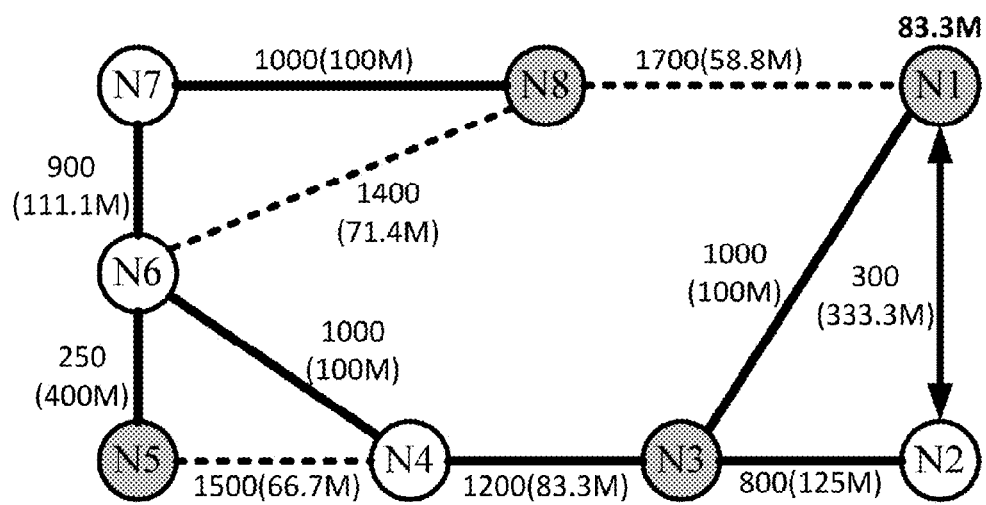
Figures 2H, 8:
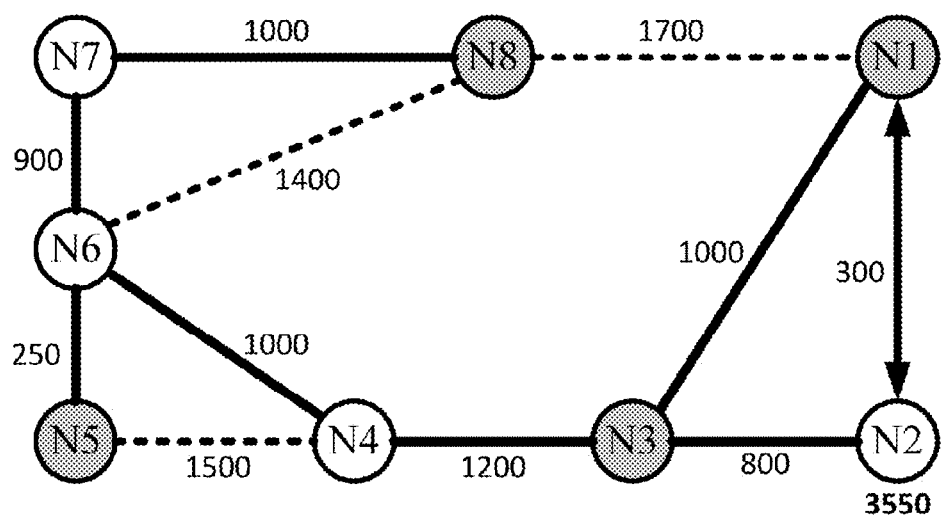

Referring to FIGS. 8-1H and 8-2H, the bandwidth and cost value of the transmission from the SDN forwarding device N5 to the SDN forwarding device N1 via the SDN forwarding device N6, N4, N3, and N2 are configured as 83.3 M and 3550 (=250+1000+1200+800+300) Accordingly, the obtained transmission paths comprise:

N5→N6 (Bandwidth: 400 M, Cost: 250);
N5→N6→N4 (Bandwidth: 100 M, Cost: 1250);
N5→N6→N7 (Bandwidth: 111.1 M, Cost: 1150);
N5→N6→N7→N8 (Bandwidth: 100 M, Cost: 2150);
N5→N6→N4→N3 (Bandwidth: 83.3 M, Cost: 2450);
N5→N6→N4→N3→N1 (Bandwidth: 83.3 M, Cost: 3450);
N5→N6→N4→N3→N2 (Bandwidth: 83.3 M, Cost: 3250); and
N5→N6→N4→N3→N2→N1 (Bandwidth: 83.3 M, Cost: 3250).

Figures 1I, 8:
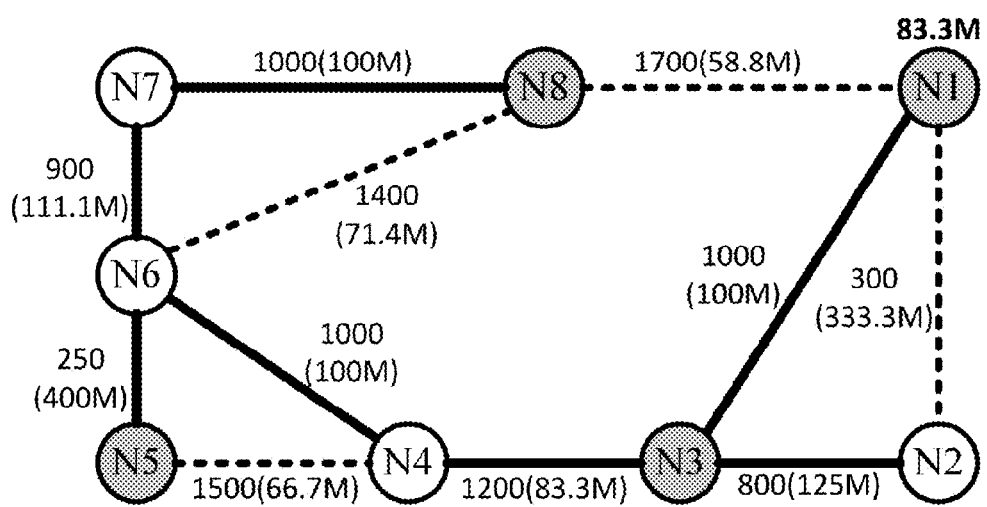
Figures 2I, 8:
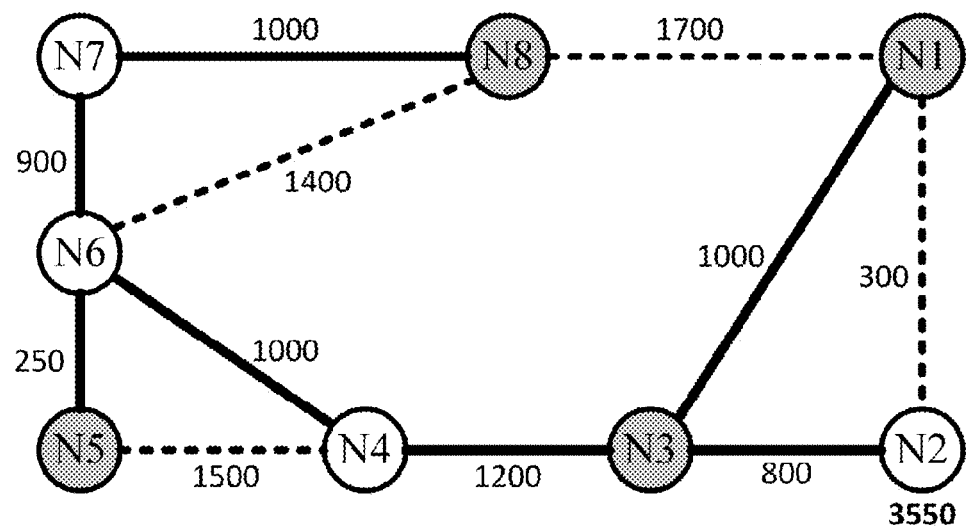

Of all the above transmission paths, transmission paths having the same beginning and ending nodes comprise N5→N6→N4→N3→N1 and N5→N6→N4→N3→N2→N1. Comparing the bandwidths and cost values, the transmission path N5→N6→N4→N3→N1 is better and is selected. Therefore, the overall transmission paths from the SDN forwarding device N5 to each of the other SDN forwarding devices are shown in FIGS. 8-1I and 8-2I, and comprise:

N5→N6 (Bandwidth: 400 M, Cost: 250);
N5→N6→N4 (Bandwidth: 100 M, Cost: 1250);
N5→N6→N7 (Bandwidth: 111.1 M, Cost: 1150);
N5→N6→N7→N8 (Bandwidth: 100 M, Cost: 2150);
N5→N6→N4→N3 (Bandwidth: 83.3 M, Cost: 2450);
N5→N6→N4→N3→N1 (Bandwidth: 83.3 M, Cost: 3450); and
N5→N6→N4→N3→N2 (Bandwidth: 83.3 M, Cost: 3250).

An embodiment of a data delivery method and system based on SDN provides an optimized network delivery service. The method calculates an optimized tree transmission path between a source client and a destination client. In addition, a unicast transmission is used to optimize a multicast transmission service.

The embodiments shown and described above are only examples. Many details are often found in the art such as the other features of an SDN controller. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a processor of a software-defined networking (SDN) controller, the method comprising:
    registering multiple SDN forwarding devices in the SDN controller and registering multiple clients in a central manager;
    enabling a first client of the multiple clients to send a transmission request of a group forwarding service to the central manager and receiving the transmission request from the central manager;
    receiving the transmission request, calculating at least one optimized transmission path and at least one backup transmission path from the first client to each of the other clients of the multiple clients using an optimized path available bandwidth (OPAB) method;
    when multiple optimized transmission paths and multiple backup transmission paths are generated, integrating the optimized transmission paths and the backup transmission paths to generate multiple tree transmission paths using an optimized forwarding path (OFP) method and retrieving an optimized tree transmission path from the multiple tree transmission paths wherein the OFP method further comprises:
        calculating multiple forwarding transmissions paths from a source SDN forwarding device of the first client to target SDN forwarding devices of the other clients using the OPAB method to generate a distance table and a path available cost (PAC) table;
        retrieving at least one optimized forwarding transmission path and multiple backup forwarding transmission paths from the source SDN forwarding device to each of the target SDN forwarding devices based on the distance table and the PAC table;
        when multiple optimized forwarding transmission paths and multiple backup forwarding transmission paths are retrieved, retrieving multiple tree forwarding transmission paths between the source SDN forwarding device and each of the target SDN forwarding device of the other client from the optimized forwarding transmission paths and the backup forwarding transmission paths to generate a tree forwarding transmission path set; and
        selecting the optimized tree transmission path from the tree forwarding transmission path set according to cost values of the multiple tree forwarding transmission paths;
    delivering entry information of the first client to the central manager and setting routing information for each of the multiple SDN forwarding devices according to the optimized tree transmission path; and
    delivering the entry information to the first client, wherein the first client receives the entry information and starts to transmit data streams to the other clients of the multiple clients via the SDN forwarding devices.

2. The method as claimed in claim 1, wherein the distance table records at least one optimized forwarding transmission path with a minimum cost value and at least one backup forwarding transmission path between SDN forwarding devices.

3. The method as claimed in claim 1, wherein the PAC table records at least one forwarding optimized transmission path with a maximum bandwidth and at least one forwarding backup transmission path between SDN forwarding devices.

4. The method as claimed in claim 1, further comprising:
    comparing a first cost value of a first forwarding transmission path and a second cost value of a second forwarding transmission path when the first forwarding transmission path and the second transmission forwarding path among the forwarding transmission paths comprise the same start and end nodes; and
    discarding the first forwarding transmission path and reserving the second forwarding transmission path when the first cost value is larger than the second cost value.

5. The method as claimed in claim 1, further comprising:
    comparing a first bandwidth of a first forwarding transmission path and a second bandwidth of a second forwarding transmission path when the first forwarding transmission path and the second forwarding transmission path among the forwarding transmission paths comprise the same start and end nodes; and reserving the first forwarding transmission path and discarding the second forwarding transmission path when the first bandwidth is larger than the second bandwidth.

6. The method as claimed in claim 1, further comprising:

comparing a first cost value of a first forwarding transmission path and a second cost value of a second forwarding transmission path when the first forwarding transmission path and the second forwarding transmission path among the forwarding transmission paths comprise the same start and end nodes;

comparing a first bandwidth of the first forwarding transmission path and a second bandwidth of the second forwarding transmission path when the first cost value is larger than the second cost value; and reserving the first forwarding transmission path and discarding the second forwarding transmission path when the first bandwidth is larger than the second bandwidth.

7. A non-transitory storage medium, storing a set of instructions, the set of instructions being executed by a processor of a creating device, to perform a method comprising:

registering multiple SDN forwarding devices in a SDN controller and registering multiple clients in a central manager;

enabling a first client of the multiple clients to send a transmission request of a group forwarding service to the central manager and receiving the transmission request from the central manager;

receiving the transmission request, calculating at least one optimized transmission path and at least one backup transmission path from the first client to each of the other clients using an OPAB method;

when multiple optimized transmission paths and multiple backup transmission paths are generated, integrating the optimized transmission paths and the backup transmission paths to generate multiple tree transmission paths using an OFP method and retrieving an optimized tree transmission path from the multiple tree transmission paths, wherein the OFP method further comprises:

calculating multiple forwarding transmissions paths from a source SDN forwarding device of the first client to target SDN forwarding devices of the other clients using the OPAB method to generate a distance table and a path available cost (PAC) table;

retrieving at least one optimized forwarding transmission path and multiple backup forwarding transmission paths from the source SDN forwarding device to each of the target SDN forwarding devices based on the distance table and the PAC table;

when multiple optimized forwarding transmission paths and multiple backup forwarding transmission paths are retrieved, retrieving multiple tree forwarding transmission paths between the source SDN forwarding device and each of the target SDN forwarding device of the other client from the optimized forwarding transmission paths and the backup forwarding transmission paths to generate a tree forwarding transmission path set; and selecting the optimized tree transmission path from the tree forwarding transmission path set according to cost values of the multiple tree forwarding transmission paths;

delivering entry information of the first client to the central manager and setting routing information for each of the multiple SDN forwarding devices according to the optimized tree transmission path; and delivering the entry information to the first client, wherein the first client receives the entry information and starts to transmit data streams to the other clients via the SDN forwarding devices.

8. The non-transitory storage medium as claimed in claim 7, wherein the distance table records at least one optimized forwarding transmission path with a minimum cost value and at least one backup forwarding transmission path between SDN forwarding devices.

9. The non-transitory storage medium as claimed in claim 7, wherein the PAC table records at least one forwarding optimized transmission path with a maximum bandwidth and at least one forwarding backup transmission path between SDN forwarding devices.

10. The non-transitory storage medium as claimed in claim 7, further comprising:

comparing a first cost value of a first forwarding transmission path and a second cost value of a second forwarding transmission path when the first forwarding transmission path and the second transmission forwarding path among the forwarding transmission paths comprise the same start and end nodes; and discarding the first forwarding transmission path and reserving the second forwarding transmission path when the first cost value is larger than the second cost value.

11. The non-transitory storage medium as claimed in claim 7, further comprising:

comparing a first bandwidth of a first forwarding transmission path and a second bandwidth of a second forwarding transmission path when the first forwarding transmission path and the second forwarding transmission path among the forwarding transmission paths comprise the same start and end nodes; and reserving the first forwarding transmission path and discarding the second forwarding transmission path when the first bandwidth is larger than the second bandwidth.

12. The non-transitory storage medium as claimed in claim 7, further comprising:

comparing a first cost value of a first forwarding transmission path and a second cost value of a second forwarding transmission path when the first forwarding transmission path and the second forwarding transmission path among the forwarding transmission paths comprise the same start and end nodes;

comparing a first bandwidth of the first forwarding transmission path and a second bandwidth of the second forwarding transmission path when the first cost value is larger than the second cost value; and reserving the first forwarding transmission path and discarding the second forwarding transmission path when the first bandwidth is larger than the second bandwidth.

13. An SDN controller, comprising:

at least one processor;

a storage system; and one or more programs that are stored in the storage system and executed by the at least one processor, the one or more programs comprising instructions for:

registering multiple SDN forwarding devices in the SDN controller and registering multiple clients in a central manager;

enabling a first client of the clients to send a transmission request of a group forwarding service to the central manager and receiving the transmission request from the central manager;

receiving the transmission request, calculating at least one optimized transmission path and at least one backup transmission path from the first client to each of the other clients using an OPAB method;

when multiple optimized transmission paths and multiple backup transmission paths are generated, integrating the optimized transmission paths and the backup transmission paths to generate multiple tree transmission paths using an OFP method and retrieving an optimized tree transmission path from the multiple tree transmission paths, wherein the OFP method further comprises:

calculating multiple forwarding transmissions paths from a source SDN forwarding device of the first client to target SDN forwarding devices of the other clients using the OPAB method to generate a distance table and a path available cost (PAC) table;

retrieving at least one optimized forwarding transmission path and multiple backup forwarding transmission paths from the source SDN forwarding device to each of the target SDN forwarding devices based on the distance table and the PAC table;

when multiple optimized forwarding transmission paths and multiple backup forwarding transmission paths are retrieved, retrieving multiple tree forwarding transmission paths between the source SDN forwarding device and each of the target SDN forwarding device of the other client from the optimized forwarding transmission paths and the backup forwarding transmission paths to generate a tree forwarding transmission path set; and selecting the optimized tree transmission path from the tree forwarding transmission path set according to cost values of the multiple tree forwarding transmission paths;

delivering entry information of the first client to the central manager and setting routing information for each of the multiple SDN forwarding devices according to the optimized tree transmission path; and delivering the entry information to the first client, wherein the first client receives the entry information and starts to transmit data streams to the other client via the SDN forwarding devices.

14. The SDN controller as claimed in claim 13, wherein the distance table records at least one optimized forwarding transmission path with a minimum cost value and at least one backup forwarding transmission path between SDN forwarding devices, the PAC table records at least one optimized forwarding transmission path with a maximum bandwidth and at least one backup forwarding transmission path between SDN forwarding devices.

15. The SDN controller as claimed in claim 13, further comprising instructions for:

comparing a first cost value of a first forwarding transmission path and a second cost value of a second forwarding transmission path when the first forwarding transmission path and the second transmission forwarding path among the forwarding transmission paths comprise the same start and end nodes; and discarding the first forwarding transmission path and reserving the second forwarding transmission path when the first cost value is larger than the second cost value.

16. The SDN controller as claimed in claim 13, further comprising instructions for:

comparing a first bandwidth of a first forwarding transmission path and a second bandwidth of a second forwarding transmission path when the first forwarding transmission path and the second forwarding transmission path among the forwarding transmission paths comprise the same start and end nodes; and reserving the first forwarding transmission path and discarding the second forwarding transmission path when the first bandwidth is larger than the second bandwidth.

17. The SDN controller as claimed in claim 13, further comprising instructions for:

comparing a first cost value of a first forwarding transmission path and a second cost value of a second forwarding transmission path when the first forwarding transmission path and the second forwarding transmission path among the forwarding transmission paths comprise the same start and end nodes;

comparing a first bandwidth of the first forwarding transmission path and a second bandwidth of the second forwarding transmission path when the first cost value is larger than the second cost value; and reserving the first forwarding transmission path and discarding the second forwarding transmission path when the first bandwidth is larger than the second bandwidth.

* * * * *